3,210,345
PHTHALOCYANINE DYESTUFFS
George Albert Gamlen, Ian Durham Rattee, Cecil Vivian Stead, and Gerald Williams, Manchester, England, assignors to Imperial Chemical Industries Limited, Millbank, London, England, a corporation of Great Britain
No Drawing. Filed June 25, 1962, Ser. No. 205,058
Claims priority, application Great Britain, July 3, 1961, 23,908/61; July 26, 1962, 7,362/62
3 Claims. (Cl. 260—242)

This invention relates to new phthalocyanine dyestuffs and more particularly it relates to new water-soluble phthalocyanine dyestuffs and to compositions of matter containing such dyestuffs which are valuable for colouring cellulose textile materials.

According to the invention there are provided the new phthalocyanine dyestuffs which, in the form of the free acids, are represented by the formula:

Formula I wherein Pc represents a phthalocyanine radical, L represents a substituted amino group of the formula:

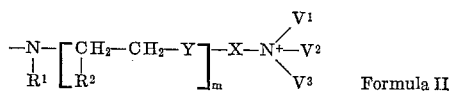

Formula II wherein $R^1$ and $R^2$ each represent a hydrogen atom or a lower alkyl radical, Y represents

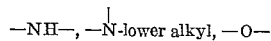

or —S—, $m$ represents 0 or 1, X represents an alkylene or substituted alkylene radical containing a chain of 2 or 3 carbon atoms between Y and the quaternary nitrogen atom, and $V^1$, $V^2$ and $V^3$ each represent hydrocarbon or heterocyclic radicals and may be the same or different, or at least two of $V^1$, $V^2$ and $V^3$ are joined or fused together to form with the nitrogen atom N a heterocyclic ring or rings, wherein the nitrogen atom N is linked to carbon atoms present in the said heterocyclic ring or rings through either single bonds or through a single bond and a double bond, M represents an amino or substituted amino group differing from the substituted amino group represented by L, $a$ represents a value of from 0 to 3, $b$ represents a value of from 1 to 2, and $c$ represents a value of from 0 to 2 provided that the sum of $a+b+c$ does not exceed 4, and that when $a$ has a value less than 0.5, the group represented by M contains a sulphonic acid or sulphate ester group, and to compositions of matter comprising mixtures of such dyestuffs and phthalocyanine dyestuffs which, in the form of the free acids, are represented by the formula:

Formula III wherein Pc, $a$, $b$ and $c$ have the meanings stated above, J represents a substituted amino group of the formula:

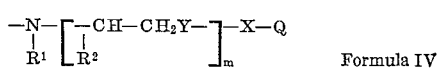

Formula IV wherein $R^1$, $R^2$, Y, X and $m$ have the meanings stated above, Q represents a chlorine or bromine atom, or a sulphate ester group, and M represents an amino or substituted amino group differing from the substituted amino group represented by J.

The values of $a$, $b$ and $c$ in the dyestuffs of Formulae I and III represent statistical values for the numbers of the different types of the groups which are present in the said dyestuffs.

It is preferred that the number of —$SO_2$—L groups, as hereinbefore defined, present in the new dyestuffs of Formula I is less than the number of sulphonic acid and/or sulphate ester groups present in the said dyestuffs.

Each of the sulphonic acid and the substituted or unsubstituted sulphonamide groups present in the dyestuffs of Formulae I and III, as hereinbefore defined, is directly attached to a carbon atom which is in the 3- or 4-position of the benz rings present in the phthalocyanine radical represented by Pc. The phthalocyanine radical Pc may be metal free, but preferably it is a stable metal-containing phthalocyanine radical such as a cobalt phthalocyanine or nickel phthalocyanine radical and, above all, a copper phthalocyanine radical.

The amino or substituted amino group represented by M is preferably an amino group of the formula:

wherein $R^3$ and $R^4$ each represent a hydrogen atom or a hydrocarbon or substituted hydrocarbon radical, or $R^3$ and $R^4$ are joined together with the nitrogen atom N to form a 5- or 6-membered heterocyclic ring.

Throughout the specification the term "lower alkyl radical" is used to denote an alkyl radical of low molecular weight, preferably an alkyl radical containing from 1 to 4 carbon atoms.

As examples of the lower alkyl radicals represented by $R^1$ and $R^2$ there may be mentioned methyl, ethyl, propyl and butyl radicals.

As examples of the alkylene or substituted alkylene radicals represented by X there may be mentioned substituted or unsubstituted alkylene radicals containing from 1 to 6 carbon atoms such as ethylene, trimethylene, propylene, β-hydroxytrimethylene, β-chlorotrimethylene and β:γ-dimethyltrimethylene radicals. It is however preferred that X represents an ethylene radical.

As examples of the hydrocarbons or substituted hydrocarbon radicals represented by $R^3$ and $R^4$ there may be mentioned alkyl radicals which are preferably lower alkyl radicals such as methyl, ethyl, propyl, and butyl radicals, substituted alkyl radicals which are preferably substituted lower alkyl radicals such as hydroxy lower alkyl radicals for example β-hydroxyethyl, β-γ-hydroxypropyl and γ-hydroxypropyl radicals, sulphate esters of hydroxy lower alkyl radicals such as the β-sulphatoethyl radical, sulpho lower alkyl radicals such as the β-sulphoethyl radical, cycloalkyl radicals such as the cyclohexyl radical, aralkyl radicals such as benzyl and β-phenylethyl radicals and aryl radicals containing water-solubilising groups such as mono- and dicyclic aryl radicals containing water-solubilising groups, carboxyphenyl, carboxy-sulphophenyl, sulphophenyl and disulphophenyl, sulphonaphthyl and disulphonaphthyl radicals.

As examples of the 5- or 6-membered heterocyclic rings which are formed by joining together $R^3$, $R^4$ and the nitrogen atom N there may be mentioned morpholine, piperazine, pyridine and pyrrolidine.

It is however preferred that $R^3$ and $R^4$ each represent a hydrogen atom.

As examples of the hydrocarbon or heterocyclic radicals represented by $V^1$, $V^2$ and $V^3$ there may be mentioned alkyl radicals for example lower alkyl radicals such as methyl, ethyl, propyl and butyl radicals, substituted lower alkyl radicals such as hydroxy substituted lower alkyl radicals, for example β-hydroxyethyl, β- or γ-hydroxypropyl and β:γ-hydroxypropyl radicals, aralkyl radicals such as benzyl and β-phenylethyl radicals, cycloalkyl radicals such as the cyclohexyl radical, alkenyl radicals such as the allyl radical and heterocyclic radicals such as pyridyl and morpholine radicals. In a preferred class at least two of the radicals represented by $V^1$, $V^2$ and $V^3$ are methyl radicals and preferably $V^1$, $V^2$ and $V^3$ each represent a methyl radical.

As examples of the heterocyclic rings formed by joining together at least two of the groups represented by $V^1$, $V^2$ and $V^3$ and the nitrogen atom N so that the nitrogen atom is joined to carbon atoms of the heterocyclic rings through single bonds there may be mentioned pyrrolidine, pyrroline, piperidine, morpholine, piperazine, pyrrole, 1:2:4-triazole and thiazzolidine rings, but a preferred class of the dyestuffs are those in which $V^1$, $V^2$ and $V^3$ are joined together to form with the nitrogen atom N a polycyclic heterocyclic ring structure in which the nitrogen atom N is common to at least 2 of the rings present in the heterocyclic ring structure and it is preferred that none of the rings present in the said heterocyclic ring structure shall contain more than two nitrogen atoms. As examples of such polycyclic heterocyclic ring structures there may be mentioned pyrrolizidine, 1-azabicyclo-(2:2:1)-heptane, quinuclidine, 1-azabicyclo-(3:2:1)-octane, 1-azabicyclo - (3:2:2) - nonane, 1 - isogranatinine, conidine, 1:5 - diazabicyclo - (3:3:1) - nonane, julolidine, hexahydrojulolidine, lilolidine, 8-methylpyrrolizidine and, above all, the 1:4 - diazabicyclo - (2:2:2) - octene ring structure.

As examples of the heterocyclic rings formed by joining or fusing together at least two of $V^1$, $V^2$ and $V^3$ so that the nitrogen atom N is joined to carbon atoms of the heterocyclic rings through a double bond and a single bond there may be mentioned unsaturated 5- or 6-membered heterocyclic rings which may contain substituents or form part of condensed ring systems. As examples of such heterocyclic rings there may be mentioned pyrimidine, thiazole, oxazole, benzoxazole, pyridazine and pyrazine and preferably quinoline, isoquinoline and, above all, pyridine rings, which may be substituted by, for example, lower alkyl radicals such as methyl and ethyl radicals, alkylamino groups such as methylamino, ethylamino, and dimethylamino groups, carboxy groups, carboalkoxy groups such as carbomethoxy and carboethoxy groups, and carbonamido groups.

According to a further feature of the invention there is provided a process for the manufacture of the new phthalocyanine dyestuffs of Formula I which comprises treating a phthalocyanine dyestuff of Formula III with a tertiary amine of the formula:

Formula V where $V^1$, $V^2$ and $V^3$ have the meanings stated above.

The process of the invention may be conveniently brought about by stirring the reactants together in water and/or a water-miscible organic liquid, preferably at a temperature between 20° and 100° C., adding sodium chloride and/or a water-miscible organic liquid such as acetone, and isolating the dyestuff which is precipitated.

As examples of tertiary amines of Formula V which can be used in the process of the invention there may be mentioned trimethylamine, N:N-dimethyl-N-ethylamine, N:N-di-methylbenzylamine, triethylamine, tri(β-hydroxyethyl)amine, N:N - dimethyl - N - β - hydroxyethylamine, N:N-dimethyl-N-β-phenylethylamine, N:N-dimethyl-N-n-dimethyl-N-n-propylamine. N:N-dimethyl-N-isopropylamine, N:N-dimethyl-N-n-butylamine, N:N-dimethylallylamine, N-methylpiperidine, pyrrolizidine, N:N'-dimethylpiperazine, N-methylpyrrolidine, 1-azabicyclo-(2:2:1)-heptane, quinuclidine, N-methylmorpholine, 1-azabicyclo-(3:2:1)-octane, 1-azabicyclo-(3:2:2)-nonane, 1-isogranatinine, conidine, 1:5-diazabicyclo-(3:3:1)-nonine, julolidine, hexahydrojulolidine, 1:4-diazabicyclo-(2:2:2)-octane, pyridine, 2-, 3- and 4-methylpyridine, 2:4-dimethylpyridine, quinoline, isoquinoline, 4-dimethylaminopyridine, pyridine-3-sulphonic acid, 2- or 4-1epidine, nicotinic acid, nicotinamide ethyl nicotinate, methyl nicotinate, 4-morpholinopyridine and 4-piperidinepyridine.

Preferred tertiary amines for use in this process of the invention are pyridine and 1:4-diazabicyclo-(2:2:2)-octane.

The phthalocyanine dyestuffs of Formula III used in the process of the invention may themselves be obtained by treating an aqueous suspension of a phthalocyanine sulphonchloride of the formula:

Formula VI wherein Pc and $a$ have the meanings stated above, and $d$ has a value of from 2 to 4 provided that $a+d$ does not exceed 4, with an amine of the formula:

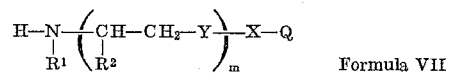

Formula VII wherein $R^1$, $R^2$, X, Y, Z and m have the meanings stated above, and optionally with an amine of the formula:

Formula VIII wherein $R^3$ and $R^4$ have the meanings stated above, and when $a$ has a value which is substantially zero optionally converting one or two of the sulphonchloride groups to sulphonic acid groups.

As examples of amines of Formula VIII which may be used to obtain the phthalocyanine dyestuffs of Formula I used in the process of the invention there may be mentioned methylamine, ethylamine, taurine, β-hydroxyethylamine, β-aminopropionic acid, N-methylglucamine, cyclohexylamine, benzylamine, aniline, aniline 3:5-disulphonic acid, orthanilic, metanilic, sulphanilic acid, anthranilic acids, aniline-2:5-disulphonic acid, m- and p-aminobenzoic acids, 4- or 5-sulphoanthranilic acid, di-(β-hydroxyethylamine and N-methyl-N-β-hydroxyethylamine, but the peferred amine of Formula VIII is ammonia.

As examples of amines of Formula VII which may be used to obtain the phthalocyanine dyestuffs of Formula I used in the process of the invention there may be mentioned β-chloro-iso-butylamine, β-bromoethylamine, β-bromo-n-propylamine, β-bromo-isopropylamine, β-sulphatoethylamine, 2-(2'-aminoethylamino)ethyl chloride, 2-(2'-aminoethoxy)-ethyl chloride, β-γ-dichloropropylamine, 2-(2'-aminoethylthio)-ethyl chloride, γ-chloro-β-hydroxypropylamine, and γ-bromo - β - hydroxypropylamine, but the preferred amine of Formula VII is β-chloroethylamine.

If desired the amines of Formula VII can be used in the form of their salts with hydrogen chloride or hydrogen bromide.

The phthalocyanine sulphonchlorides of Formula VI may be obtained by treating the corresponding phthalocyanine or phthalocyanine sulphonic acid with chlorosulphonic acid, if desired in the presence of carbon tetrachloride or an acid halide such as thionyl chloride, sulphuryl chloride, phosphorus pentachloride, phosphorus oxychloride and phosphorus trichloride, for example as described in British specifications Nos. 708,543, 784,843 and 785,629 and in the United States Patent No. 2,219,330.

Specific examples of phthalocyanine dyestuffs of Formula III which can be used to obtain the phthalocyanine dyestuffs of Formula I are described in British specification No. 826,689 and in Belgian specifications Nos. 593,939 and 597,143.

According to a further feature of the invention there is provided an alternative process for the manufacture of the new phthalocyanine dyestuffs of Formula I which comprises treating an aqueous suspension of a phthalocyanine sulphonchloride of Formula VI, as hereinbefore defined, with an amino having a cation of the formula:

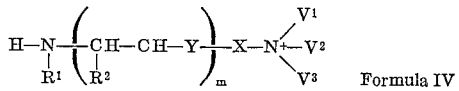 Formula IV wherein $R^1$, $R^2$ $V^1$, $V^2$, $V^3$, X Y and m have the meanings stated above, and optionally with an amine of Formula VIII, as hereinbefore defined, and when $a$ has a value which is substantially zero optionally converting one or two of the sulphonchloride groups to sulphonic acid groups.

This process of the invention may be conveniently brought about by adding the amine having a cation of Formula IX, and if necessary the amine of Formula VIII or an aqueous solution of the said amine or amines, to an aqueous suspension of the phthalocyanine sulphonchloride, stirring the resulting mixture, preferably at a temperature between 0° and 50° C., whilst adding an acid-binding agent, such as sodium carbonate, to maintain the pH of the mixture between 7 and 8, and when insufficient of the amines of Formulae IX and VIII are used to react with all the sulphonchloride groups, the sulphonchloride group or groups which do not react with the said amine or amines are hydrolysed to sulphonic acid groups.

When an amine of Formula VIII is also used in this process then it is preferred that this amine be also used as the acid-binding agent in which case an excess amount of the amine over that required to react with the sulphonchloride groups is used, the said excess combining with the hydrochloric acid which is liberated.

At the conclusion of the process the dyestuff so obtained is filtered off, if necessary after first adding sodium chloride or an acid such as hydrochloric acid, and is finally dried.

The amines of Formula IX may themselves be obtained by treating an amine of Formula VII with a tertiary amine of Formula V.

As specific examples of amines having cations of Formula IX which can be used in this alternative process of the invention there may be mentioned amines having the following cations:

β-pyridinium ethylamine
β-trimethylammonium ethylamine
β-(β'pyridinium ethylamino)ethylamine.

The compositions of matter comprising mixtures of the phthalocyanine dystuffs of Formulae I and III may be obtained by mixing or grinding together the two dyestuffs in the desired proportions. Alternatively the compositions of matter may be obtained by co-precipitating the two dyestuffs from an aqueous solution, for example by adding sodium chloride, and subsequently isolating and drying the precipitated mixture of dyestuffs.

The proportion of the two dyestuffs present in the compositions of matter is not critical but it is preferred that the dyestuff of Formula III constitutes at least 50% by weight, and preferably between 75% and 95% by weight, of the total amount of the two dyestuffs present.

If desired the compositions of matter may also contain other substances which are commonly present in commercial brands of dyestuffs, such as inorganic diluents, for example sodium chloride and sodium sulphate, urea, cationic surface-active agents such as cetyl trimethylammonium bromide, anionic surface-active agents such as sodium triisopropyl naphthalene sulphonate, and non-ionic surface-active agents such as condensates of ethylene oxide with amines, alcohols and phenols.

One preferred class of the new phthalocyanine dyestuffs of Formula I are the phthalocyanine dyestuffs which, in the form of the free acids, are represented by the formula:

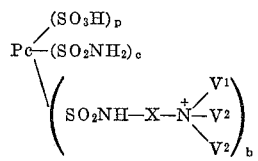

wherein Pc, $V^1$, $V^2$, $V^3$, b and c have the meanings stated above and p has a value of from 1 to 3, provided that $b+c+p$ does not exceed 4.

A second preferred class of the new phthalocyanine dyestuffs of Formula I are the phthalocyanine dyestuffs which, in the form of the free acids, are represented by the formula:

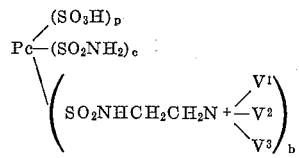

wherein Pc, $V^1$, $V^2$, $V^3$, b, c and p have the meanings stated above,

In this preferred class it is however preferred that Pc represents a copper phthalocyanine radical, and that, in the second class, the group of the formula:

is a group of the formula:

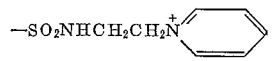

or

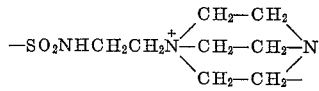

A preferred class of the compositions of matter of the invention are the compositions of matter comprising a mixture of a dyestuff which, in the form of the free acid, is represented by the formula:

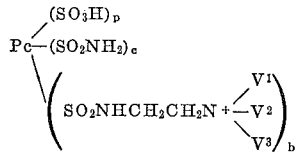

wherein Pc, $V^1$, $V^2$, $V^3$, b, c and p have the meanings stated above, and a dyestuff, which in the form of a free acid, is represented by the formula:

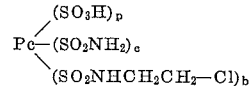

wherein Pc, b, c and p have the meanings stated above.

In this preferred class it is preferred that the

group represents the group of the formula:

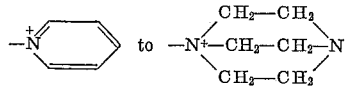

and Pc represents a copper phthalocyanine radical.

The new dyestuffs of Formula I and the compositions of matter valuable for colouring natural and artificial textile materials for example textile materials comprising cotton, viscose rayon, regenerated cellulose, wool, silk, cellulose acetate, polyamides, polyacrylonitrile, modified polyacrylonitrile and aromatic polyester fibres. For this purpose the dyestuffs or compositions of matter can be applied to the textile materials by dyeing, padding or printing using printing pastes containing the conventional thickening agents or oil-in-water emulsions or water-in-oil emulsions, whereby the textile materials are coloured in bright shades possessing excellent fastness to light and to wet treatments such as washing. It is also found that heavy depths of shade can be obtained from the new dyestuffs or from the compositions of matter.

The new dyestuffs and the compositions of matter are particularly valuable for colouring cellulose textile materials. For this purpose the dyestuffs or the compositions of matter are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance, such as sodium bicarbonate or sodium trichloroacetate, which on heating or steaming liberates an acid-binding agent, can be used.

For example the cellulose textile material can be coloured by treating the cellulose textile material with an aqueous solution or suspension of the acid-binding agent and then immersing the so-treated cellulose textile material in a dyebath comprising a solution of one or more of the new dyestuffs, or the compositions of matter, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs or the compositions of matter.

Alternatively the aqueous solution of the dyestuff or the composition of matter may be applied by padding to the cellulose textile material which has been treated with the acid-binding agent and the cellulose textile material then padded through rollers and subsequently subjected to the action of heat or steam. Alternatively the cellulose textile material can be padded with an aqueous solution of one or more of the new dyestuffs or the compositions of matter, which solution also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of one or more of the said dyestuffs or the compositions of matter which solution also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs or the compositions of matter can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs or the compositions of matter, preferably at a temperature of between 20° and 100° C., and, after the textile material has absorbed some or all of the dyestuffs, adding an acid-binding agent and proceeding with the dyeing at the same or a different temperature.

The concentration of the acid-binding agent present in the aqueous solution is not critical but it is preferred to use between 0.1% and 10% of the acid-binding agent based on the total weight of the aqueous solution. If desired the aqueous solution or suspension of the acid-binding agent may also contain further substances, for example electrolytes such as sodium chloride and sodium sulphate.

The aqueous solution of one or more of the said dyestuffs or the compositions of matter may also contain substances which are known to assist the application of dyestuffs to textile materials, for example sodium chloride, sodium sulphate, urea, dispersing agents, surface-active agents, sodium alginate or an emulsion of an organic liquid for example trichloroethylene in water.

Alternatively the cellulose textile materials can be printed with a printing paste containing one or more of the new dyestuffs or the compositions of matter.

This may be conveniently brought about by applying a printing paste containing one or more of the said dyestuffs or compositions of matter, to a cellulose textile material which has been impregnated with an acid-binding agent and thereafter subjecting the printed cellulose textile material to the action of heat or steam. Alternatively a printing paste containing one or more of the said dyestuffs or the compositions of matter and containing an acid-binding can be applied to the cellulose textile material and the printed cellulose textile material subsequently subjected to the action of heat or steam. Alternatively a printing paste containing one or more of the said dyestuffs or the compositions of matter can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C. before the printed textile material is subjected to the action of heat or steam.

The cellulose textile material may be printed with the printing paste by any of the commonly known methods of applying pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the colored cellulose textile material in water before drying it.

The new dyestuffs or the compositions of matter can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

Alternatively the new dyestuffs or the compositions of matter can be applied to textile materials, which are preferably cellulose textile materials, in conjunction with a treatment with a resin-forming composition as an acid-catalyst whereby the textile material is simultaneously coloured and rendered resistant to creasing. This colouring process may be conveniently carried out by padding or printing the textile material with an aqueous solution containing (a) a new dyestuff or composition of matter, (b) a resin-forming composition and (c) an acid-catalyst, optionally drying the treated textile material, and subsequently heating the textile material at a temperature above 100° C., preferably at a temperature between 130° and 170° C.

As examples of resin-forming compositions there may be mentioned epoxy resins, polyisocyanates, condensates of formaldehyde with cresols or with acrolein, and in particular mixtures comprising the methylol derivatives of monomeric or polymeric compounds containing a plurality of amine or mono substituted amino groups, said compounds being known from the art or used in practice for the formation of resins by condensation with formaldehyde. Such compounds include, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, urons, ureins, ureides, imidazolidines, triazones and hydantoins, or mixtures of such compounds, and polymeric nitrogen compounds such as the polymeric amides made by the reaction of dibasic acids with diamines. The lower ethyl ethers of the methylol derivatives of these compounds include for example the methyl, ethyl, propyl and butyl ethers.

The quantity of the resin-forming composition which is present in the aqueous solution used in this colouring process usually amounts to between 3% and 30% by weight of the aqueous solution and is preferably between 5% and 20% by weight of the aqueous solution.

As examples of acid-catalysts there may be mentioned salts from weak bases and mineral acids such as zinc chloride, ammonium sulphate, ammonium nitrate, ammonium chloride and magnesium chloride and mineral acid salts of organic amines, which are preferably primary or secondary organic amines which contain at least one alkyl chain carrying at least one hydroxy group. As specific examples of such primary or secondary amines containing one or two hydroxyalkyl groups there may be mentioned β-hydroxyethylamine, N-methyl-N-(β-hydroxyetheyl)amine, N - ethyl - N-(β-hydroxethyl)amine, γ-hydroxypropylamine, β-hydroxypropylamine, β-, γ- or δ-hydroxy-n-butylamine, N:N-di(β-hydroxyethyl)amine, N:N-di(β-hydroxypropyl)amine, N-(β-hydroxyethyl)-aniline or -benzylamine, β:γ-dihydroxypropylamine, N-methylglucamine (also known as N-methyl-N-pentahydroxy-n-hexylamine), N-ethylglucamine, N-(β-hydroxyethyl)glucamine, N - methyl - N-(β:γ-dihydroxypropyl) amine and 2-amino-1:2:3-propanetriol.

The quantity of the acid-catalyst present in the aqueous solution usually amounts to between 0.1% and 2.0% of the aqueous solution.

Alternatively the dyestuffs or compositions of matter can be applied to textile materials, which are preferably cellulose textile materials, in conjunction with a cross-linking agent which optionally contains a group or groups with which the dyestuffs can react, so that the dyestuffs become attached to the textile materials and/or to the cross-linking agent through chemical bonds.

The invention is illustrated but not limited by the following examples in which the parts and percentages are by weight:

Example 1

11.5 parts of copper phthalocyanine are slowly added with stirring to 54.0 parts of chlorosulphonic acid and the resulting mixture is stirred for 3 hours at a temperature between 140° and 145° C. The mixture is cooled to 80° C., 10 parts of thionyl chloride are added and the mixture is then stirred for 2 hours at a temperature of 85° C. The mixture is cooled to 20° C., poured onto ice, and the precipitated copper phthalocyanine tetra 3-sulphonchloride is filtered off and washed with 100 parts of a 1% aqueous solution of hydrochloric acid which has been cooled to 0° C.

The paste of sulphonchloride so obtained is stirred with 100 parts of water and 60 parts of ice, and 17.0 parts of a 20.4% aqueous solution of β-chloroethylamine hydrochloride are then added. The pH of the resultant mixture is adjusted to 8 by the addition of a 2 N aqueous solution of ammonium hydroxide and the temperature of the mixture is then raised to 50° C. during 1 hour and maintained at 50° C. for 15 minutes, the pH of the mixture being maintained at 8 by further additions of a 2 N aqueous solution of ammonium hydroxide. The resulting solution is then cooled to 20° C., and is acidified to pH 3 by the addition of a concentrated aqueous solution of hydrochloric acid. The precipitated dyestuff is then filtered off, washed with a 1% aqueous solution of hydrochloric acid and dried.

A solution of this dyestuff compound in a mixture of 115 parts of water and 115 parts of pyridine is stirred at the boil under a reflux condenser for 20 hours. The solution is then cooled to 20° C., poured into 1,500 parts of water and the precipitated dyestuff is filtered off. The resulting solid is dissolved in a mixture of 300 parts of water and 10 parts of a 2 N aqueous solution of sodium hydroxide, 10 parts of a concentrated aqueous solution of hydrochloric acid are added and the precipitated dyestuff is filtered off, washed with acetone and dried.

On analysis the dyestuff so obtained is found to contain 1.8 sulphonic acid groups, 1.0 —SO₂NH₂ group and

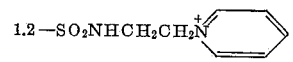

groups per molecule of copper phthalocyanine.

When applied to cellulose textile materials in conjunction with a treatment with an acid-binding agent the dyestuff yields greenish-blue shades which possess excellent fastness to light and to wet treatments.

In place of the 17.0 parts of a 20.4% aqueous solution of β-chloroethylamine hydrochloride used in the above example there are used 4.94 parts of β:γ-dichloropropylamine hydrochloride or 4.38 parts of γ-chloro-β-hydroxypropylamine hydrochloride when similar dyestuffs are obtained.

In place of the 115 parts of pyridine used in the above example there are used 190 parts of N-methyl-N:N-di(β-hydroxyethyl)amine or 130 parts of N:N-dimethyl-N-β-hydroxyethylamine when similar dyestuffs are obtained.

Example 2

A mixture of 15 parts of the dyestuff of Example 1 of British specification No. 826,689, 10 parts of pyridine and 250 parts of water is stirred for 16 hours at a temperature between 85° and 90° C. The mixture is then cooled to 20° C., 500 parts of acetone are added and the precipitated dyestuff is filtered off, washed with acetone and dried.

When applied to cellulose textile materials in conjunction with a treatment with an acid-binding agent the dyestuff yields bright greenish-blue shades which possess excellent fastness to light and to wet treatments, and the shades obtained are stronger tinctorially than the shades of colourations similarly obtained from the dyestuff of Example 1 of British specification No. 826,689.

*Example 3*

11.5 parts of copper phthalocyanine are treated with chlorosulphonic acid as described in the first paragraph of Example 1, and the resulting paste of copper phthalocyanine sulphonchloride is stirred with 100 parts of ice. 5.2 parts of β-(pyridinium chloride)ethylamine perchlorate are then added and the pH of the resulting mixture is raised to 7 by the addition of a 2 N aqueous solution of sodium carbonate. The mixture is then stirred at 50° C. for 1 hour, the pH of the mixture being maintained between 7 and 8 by additions of a 2 N aqueous solution of sodium carbonate. The resulting solution is then filtered and the pH of the filtrate is lowered to 3 by the addition of a concentrated aqueous solution of hydrochloric acid. The precipitated dyestuff is then filtered off, washed with a 1% aqueous solution of hydrochloric acid and dried.

When applied to cellulose textile materials in conjunction with a treatment with an acid-binding agent the dyestuff yields greenish-blue shades possessing excellent fastness to wet treatments.

The β-(pyridinium chloride)ethylamine perchlorate used in the above example may be obtained as follows:

A mixture of 50 parts of pyridine and 100 parts of a 17% aqueous solution of β-chloroethylamine hydrochloride is stirred for 2 hours at the boil under a reflux condenser. The resulting solution is then cooled to 20° C., extracted with 200 parts of diethylether, and to the resulting aqueous layer there is added sodium perchlorate. The solid which is precipitated is then filtered off, washed with acetone and dried. The solid crystallises from a mixture of methanol and water in the form of white crystals. On analysis the product is found to contain 32.6% of carbon, 4.4% of hydrogen and 10.8% of nitrogen. $C_7H_{11}O_4N_2Cl_3$ requires 32.6% of carbon, 4.3% of hydrogen and 10.8% of nitrogen.

*Example 4*

In place of the 2 N aqueous solution of sodium carbonate used in Example 3 there is used a 2 N aqueous solution of ammonium hydroxide when a dyestuff is obtained which contains 2 sulphonic acid groups, 0.8 sulphonamide group and

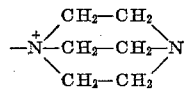

groups per molecule of dyestuff.

*Example 5*

A stirred mixture of 35 parts of the dyestuff of Example 7 of British specification No. 826,689, 10 parts of 1:4-diazabicyclo-(2:2:2)-octane and 350 parts of water is slowly heated to 75° C., and the mixture is then maintained at this temperature for 4½ hours. The mixture is then cooled to 20° C., poured into 1,000 parts of acetone, and the precipitated dyestuff is filtered off, washed with acetone and dried. On analysis the dyestuff is found to contain 1.8 quaternary groups of the formula:

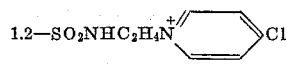

per molecule of dyestuff.

When applied to cellulose textile materials in conjunction with a treatment with an acid-binding agent the dyestuff yields greenish-blue shades which possess excellent fastness to light and to wet treatments, and the shades obtained are stronger tinctorially than the shades of the colourations which are similarly obtained from the dyestuff of Example 7 of British specification No. 826,689.

*Example 6*

11.5 parts of copper phthalocyanine are chlorosulphonated as described in Example 1, and the resulting paste of copper phthalocyanine sulphonchloride is stirred with 100 parts of water and 100 parts of ice. 168 parts of diethanolamine and 6.24 parts of β-(pyridinium chloride)ethylamine perchlorate are added and the pH of the resulting mixture is raised to 8 by the addition of a 2 N aqueous solution of sodium carbonate. The mixture is heated to 50° C. during 30 minutes, and the mixture is then stirred at 50° C. for 6 hours, the pH of the mixture being maintained at 8 by further additions of a 2 N aqueous solution of sodium carbonate. The mixture is finally stirred at 50° C. for a further 16 hours. The mixture is acidified with a concentrated aqueous solution of hydrochloric acid to precipitate the product, which is then filtered off, washed with 100 parts of a 2 N aqueous solution of hydrochloric acid and dried.

18 parts of the resulting solid are added to a mixture of chlorosulphonic acid and pyridine (prepared by adding 8.5 parts of chlorosulphonic acid to 200 parts of pyridine at a temperature below 25° C.), and the mixture is stirred for 30 minutes at 20° to 25° C. The mixture is then heated to 80° to 90° C., and stirred at this temperature for 16 hours. The mixture is then cooled to 20° C., poured into water, and potassium acetate is added to precipitate the dyestuff, which is then filtered off and dried.

On analysis the dyestuff so obtained is found to contain 2.3 sulphonic acid groups, 0.5 $—SO_2N(CH_2CH_2OSO_3H)_2$ and

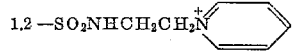

groups per molecule of copper phthalocyanine.

When applied to cellulose textile materials in conjunction with a treatment with an acid-binding agent the dyestuff yields greenish-blue shades which possess excellent fastness to light and to wet treatments.

*Example 7*

14.4 parts of copper phthalocyanine are chlorosulphonated by the method described in Example 1, and the resulting paste of copper phthalocyanine sulphonchloride is stirred with 200 parts of water at 10° C. The pH of the mixture is adjusted to 4 by the addition of an aqueous solution of sodium hydroxide and a solution of 6.1 parts of β-chloroethylamine hydrochloride in 20 parts of water, and a solution of 3.9 parts of sodium metanilate in 20 parts of water are then added. The pH of the resulting mixture is raised by 8 by the addition of a 2 N aqueous solution of sodium carbonate, and the mixture is heated to 50° C. during 1 hour and maintained at 50° C. for 1 hour, while the pH is maintained at 8 by further additions of a 2 N aqueous solution of sodium carbonate. The mixture is then cooled to 20° C., acidified with a concentrated aqueous solution of hydrochloric acid, and the precipitated product is filtered off, washed with 10% aqueous solution of hydrochloric acid and dried.

A solution of 22 parts of the resulting solid in a mixture of 100 parts of water and 140 parts of pyridine is stirred at the boil under a reflux condenser for 3 hours. The solution is then cooled to 20° C., poured into 400 parts of acetone, and the precipitated dyestuff is filtered off, washed with acetone and dried.

On analysis the dyestuff so obtained is found to contain 1.9 sulphonic acid groups,

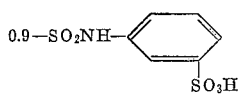

group and

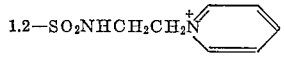

groups per molecule of copper phthalocyanine.

When applied to cellulose textile materials in conjunction with a treatment with an acid-binding agent the dyestuff yields greenish-blue shades which possess excellent fastness to light and to wet treatments.

*Example 8*

11.5 parts of copper phthalocyanine are chlorosulphonated as described in Example 1 and the paste of copper phthalocyanine sulphonchloride is stirred with 100 parts of water and 100 parts of ice. 4.8 parts of N-β-chloroethylethylenediamine dihydrochloride and 2.83 parts of metanilic acid are then added and the pH of the mixture is adjusted to 8 by the addition of a 2 N aqueous solution of sodium carbonate. The mixture is then heated to 50° C. during 1 hour and maintained at 50° C. for 5 hours, while the pH of the mixture is maintained at 7.5 to 8 by the addition of a 2 N aqueous solution of sodium carbonate. The mixture is then cooled to 20° C., acidified with a concentrated aqueous solution of hydrochloric acid and the precipitated product is filtered off, washed with 200 parts of a 2 N aqueous solution of hydrochloric acid and dried.

A mixture of 18 parts of the resulting solid, 120 parts of water and 150 parts of pyridine is stirred at the boil under a reflux condenser for 20 hours. The mixture is then cooled to 20° C., poured into acetone, and the precipitated dyestuff is filtered off, washed with acetone and dried.

On analysis the dyestuff so obtained is found to contain

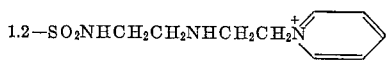

groups per molecule of copper phthalocyanine.

When applied to cellulose textile materials in conjunction with a treatment with an acid-binding agent the dyestuff yields greenish-blue shades which possess excellent fastness to light and to wet treatments.

*Example 9*

11.5 parts of copper phthalocyanine are chlorosulphonated as described in Example 1 and the paste of copper phthalocyanine sulphonchloride is stirred with 100 parts of water and 100 parts of ice. The pH of the mixture is adjusted to 7 by the addition of an aqueous solution of sodium hydroxide and 4.2 parts of anthranilic acid are then added. The mixture is then warmed to 20° C. during 1 hour, 6.24 parts of β-(pyridinium chloride)ethylamine perchlorate are added, and the pH of the mixture is again adjusted to 7 by the addition of an aqueous solution of sodium hydroxide. The mixture is then heated to 45° to 50° C. and maintained at this temperature for 5 hours, while the pH is maintained at 7 to 8 by the addition of a 2 N aqueous solution of sodium carbonate. The mixture is then cooled to 20° C., acidified with a concentrated aqueous solution of hydrochloric acid and the precipitated dyestuff is filtered off and dried.

On analysis the dyestuff so obtained is found to contain 2,3 sulphonic acid groups,

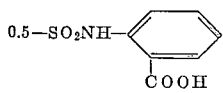

and

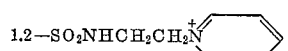

groups per molecule of copper phthalocyanine.

When applied to cellulose textile materials in conjunction with a treatment with an acid-binding agent the dyestuff yields greenish-blue shades which possess excellent fastness to light and to wet treatments.

*Example 10*

14.4 parts of copper phthalocyanine are chlorosulphonated as described in Example 1 and the paste of copper phthalocyanine sulphonchloride is stirred in 200 parts of water at 5° C. The pH of the mixture is adjusted to 4 by the addition of an aqueous solution of soduim hydroxide, a solution of 6.1 parts of β-chloroethylamine hydrochloride in 20 parts of water and 6.35 parts of aniline-3:5-disulphonic acid are added, and the pH of the mixture is re-adjusted to 8 by addition of an aqueous solution of sodium hydroxide. The mixture is heated to 50° C., and maintained at 50° C. for 1 hour keeping the pH at 8 by further additions of a 2 N aqueous solution of sodium carbonate. The mixture is then acidified with a concentrated aqueous solution of hydrochloric acid, and 200 parts of acetone are added. The precipitated product is the filtered off and dried. A mixture of 16.4 parts of the above solid, 100 parts of water and 140 parts of pyridine is stirred at the boil under a reflux condenser for 3 hours. The mixture is then cooled to 20° C., poured into acetone and the precipitated dyestuff is filtered off, washed with acetone and dried.

On analysis the dyestuff so obtained is found to contain

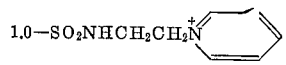

group per molecule of copper phthalocyanine.

When applied to cellulose textile materials in conjunction with a treatment with an acid-binding agent the dyestuff yields greenish-blue shades which possess excellent fastness to light and to wet treatments.

*Example 11*

11.5 parts of copper phthalocyanine are chlorosulphonated as described in Example 1, and the paste of copper phthalocyanine sulphonchloride is stirred with 100 parts of water and 100 parts of ice. 3.48 parts of γ - chloro - β - hydroxypropylaminehydrochloride and 2.76 parts of metanilic acid are added and the pH of the mixture is raised to 8 by the addition of a 2 N aqueous solution of sodium carbonate. The mixture is heated to 50° C., during 30 minutes and held at 50° C. for 4 hours, whilst the pH is maintained by the addition of a 2 N aqueous solution of sodium carbonate. The mixture is then cooled to 20° C., acidified with a concentrated aqueous solution of hydrochloric acid, and the precipitated product is filtered off, washed with 200 parts of a 2 N aqueous solution of hydrochloric acid and dried. A mixture of 15 parts of the above solid, 100 parts of water and 110 parts of pyridine is stirred at the boil under a reflux condenser for 20 hours. The mixture is then cooled to 20° C., poured into acetone, and the precipitated dyestuff is filtered off, washed with acetone and dried.

On analysis the dyestuff so obtained is found to contain

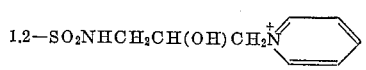

groups per molecule of copper phthalocyanine.

When applied to cellulose textile materials in conjunction with a treatment with an acid-binding agent the dyestuff yields greenish-blue shades which possess excellent fastness to light and to wet treatments.

Example 12

11.5 parts of copper phthalocyanine are chlorosulphonated as described in Example 1 and the resulting paste of copper phthalocyanine sulphonchloride is stirred with 100 parts of water and 100 parts of ice. A solution of 1.22 parts of monoethanolamine in 10 parts of water is added and the pH of the mixture is adjusted to between 7 and 8 by the addition of a 2 N aqueous solution of sodium carbonate. The mixture is then warmed to 20° C. during 1 hour whilst maintaining the pH at 7 to 8 by the addition of sodium carbonate solution. A solution of 3.25 parts of β-chloroethylamine hydrochloride in 10 parts of water is then added, the mixture is heated to between 45 and 50° C., and maintained at this temperature for 6 hours whilst the pH is maintained at 7 to 8 by further additions of a 2 N aqueous solution of sodium carbonate. The mixture is then cooled, acidified with a concentrated aqueous solution of hydrochloric acid, and the precipitated product is filtered off, washed with 200 parts of a 2 N aqueous solution of hydrochloric acid and dried.

A mixture of 14 parts of the above solid, 100 parts of water and 50 parts of a 40% aqueous solution of trimethylamine, is stirred at 80° to 90° for 5 hours. The mixture is then cooled to 20° C., poured into acetone, and the precipitated dyestuff is filtered off, washed with acetone and dried.

On analysis the dyestuff so obtained is found to contain 1.9 sulphonic acid groups,

and

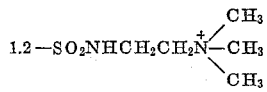

groups per molecule of copper phthalocyanine.

When applied to cellulose textile materials in conjunction with a treatment with an acid-binding agent the dyestuff yields greenish-blue shades which possess excellent fastness to light and to wet treatments.

Example 13

5.65 parts of chlorosulphonic acid are slowly added to 150 parts of pyridine, at a temperature below 25° C., 11.1 parts of the dyestuff of Example 12 are then gradually added during 30 minutes, and the mixture is stirred for 1 hour at 25° C. The mixture is then heated to 80° to 90° C. and stirred for 5 hours at this temperature. The mixture is then cooled to 20° C., the excess pyridine is decanted off, and the residue is stirred with 100 parts of ethanol. The precipitated solid is then filtered off, washed with ethanol and dried.

When applied to cellulose textile materials in conjunction with a treatment with an acid-binding agent the dyestuff yields greenish-blue shades which possess excellent fastness to light and to wet treatments.

Example 14

In place of the paste of copper phthalocyanine - 3 - sulphonchloride used in Example 1 there is used a paste of copper phthalocyanine - 4 - sulphonchloride which is obtained as follows:

17.7 parts of the sodium salt of copper phthalocyanine-tri-4-sulphonic acid are added to 74 parts of chlorosulphonic acid and the mixture is stirred at 135° to 140° C. for 3 hours. The mixture is then cooled to 80° C., 10 parts of thionyl chloride are added during 1 hour, and the mixture is stirred at 80° to 85° C. for 2 hours. The mixture is then cooled to 10° C., poured on to ice and the precipitated sulphonchloride is filtered off and washed with a 19% aqueous solution of hydrochloric acid cooled to 1° C.

The dyestuffs so obtained when applied to cellulose textile material in conjunction with a treatment with an acid-binding agent yield turquoise shades which possess excellent fastness to light and to wet treatments.

Example 15

1 part of the dyestuff of Example 5 and 9 parts of the dyestuff of Example 7 of British specification No. 826,689 are finely ground together so that an intimate mixture is obtained.

The composition so obtained when applied to cellulose materials in conjunction with a treatment with an acid-binding agent yields greenish-blue dyeings which are tinctorially stronger than dyeings similarly obtained using only the dyestuff of Example 7 of British specification No. 826,689.

Alternatively, the mixture of the two dyestuffs can be obtained by suspending the 2 dyestuffs in 100 parts of water, adding sodium carbonate to raise the pH to between 7 and 8, adding an aqueous solution of hydrochloric acid, and isolating the dyestuff which is precipitated.

Example 16

1 part of the first dyestuff of Example 1 and 9 parts of the dyestuff compound obtained as described in the first two paragraphs of Example 1 are mixed together so that an intimate mixture is obtained. When applied to cellulose textile materials in conjunction with a treatment with an acid-binding agent the composition so obtained gives dyeings which are tinctorially stronger than dyeings which are similarly compounded from the said dyestuff compound.

Example 17

In place of the 5.2 parts of β-(pyridinium chloride)-ethylamine perchlorate used in Example 4 there is used a mixture of 3.13 parts of β-chloroethylamine hydrochloride and 0.78 part of β-(pyridinium chloride)ethylamine perchlorate when a dyestuff composition is obtained which is similar in dyeing properties to the dyestuff of Example 4.

Example 18

14.4 parts of copper phthalocyanine are chlorosulphonated as described in Example 1 and the resulting paste of copper phthalocyanine sulphonchloride is stirred with 200 parts of water at 15° C. 4.2 parts of a 30% aqueous solution of dimethylamine are added and the pH of the mixture is adjusted to between 7 and 8 by the addition of a 2 N aqueous solution of sodium carbonate. The mixture is then stirred at 15° C. whilst maintaining the pH at 7 by the addition of 16 parts of a 4% aqueous solution of sodium hydroxide. A solution of 4.35 parts of β-chloroethylamine hydrochloride in 10 parts of water is then added, the mixture is heated to 50° C. and maintained at this temperature for 30 minutes whilst the pH is maintained at 8 by additions of a 4% aqueous solution of sodium hydroxide. The mixture is then cooled, acidified with a concentrated aqueous solution of hydrochloric acid, and the precipitated product is filtered off, washed with 200 parts of a 2 N aqueous solution of hydrochloric acid and dried.

A mixture of the above solid, 100 parts of water and 110 parts of pyridine is stirred at the boil under a reflux condenser. The mixture is then cooled to 20° C., poured into acetone, and the precipitated dyestuff is filtered off, washed with acetone and dried.

When applied to cellulose textile materials in conjunction with a treatment with an acid-binding agent the dyestuff yields greenish-blue shades which possess excellent fastness of light and to wet treatments.

In place of the 4.2 parts of a 30% aqueous solution of dimethylamine used in the above example there are used equivalent amounts of N-(β-hydroxyethyl)amine, piperidine, N-methylglucamine, morpholine, pyrrolidine, benzylamine, cyclohexylamine or sodium β-aminoethane sulphonate when similar dyestuffs are obtained.

Example 19

A stirred mixture of 35 parts of the dyestuff compound obtained as described in the first two paragraphs of Example 1, 10 parts of 1:4-diazabicyclo-(2:2:2)-octane and 350 parts of water is slowly heated to 75° C. and the mixture is then maintained at this temperature for 4½ hours. The mixture is then cooled to 20° C., poured into 1000 parts of acetone, and the precipitated dyestuff is filtered off, washed with acetone and dried. On analysis the dyestuff is found to contain 1.2 quaternary groups of the formula:

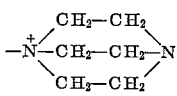

per molecule of dyestuff.

When applied to cellulose textile materials in conjunction with a treatment with an acid-binding agent the dyestuff yields greenish-blue shades which possess excellent fasteness to light and to wet treatments, and the shades obtained are stronger tinctorially than the shades of the colourations which are similarly obtained from the said dyestuff compound used as starting material.

Example 20

A mixture of 15 parts of the dyestuff of Example 7 of British specification No. 826,689, 10 parts of pyridine and 250 parts of water is stirred for 16 hours at a temperature between 85° and 90° C. The mixture is then cooled to 20° C., 500 parts of acetone are added and the precipitated dyestuffs is filtered off, washed with acetone and dried.

When applied to cellulose textile materials in conjunction with a treatment with an acid-binding agent the dyestuff yields bright greenish-blue shades which possess excellent fastness to light and to wet treatments, and the shades obtained are stronger tinctorially than the shades of colourations similarly obtained from the dyestuff of Example 7 of British specification No. 826,689.

Example 21

In place of the 11.5 parts of copper phthalocyanine used in Example 1 there are used 11.5 parts of cobalt phthalocyanine or 11.5 parts of nickel phthalocyanine whereby dyestuffs are obtained which are similar in constitution to the copper phthalocyanine dyestuffs of Example 1, but which are slightly redder or slightly greener in shade than the corresponding dyestuffs derived from copper phthalocyanine.

What we claim is:

1. Copper phthalocyanine which contains from 1 to 3 sulphonic acid groups, from 0 to 2 —$SO_2NH_2$ groups and from 1 to 2 groups of the formula:

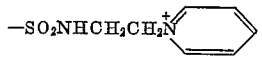

provided that the sum of such groups does not exceed 4.

2. Copper phthalocyanine which contains from 1 to 3 sulphonic acid groups, from 0 to 2 —$SO_2NH_2$ groups and from 1 to 2 groups of the formula:

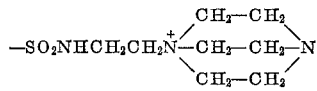

provided that the sum of such groups does not exceed 4.

3. A compound of the formula:

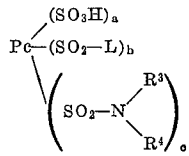

wherein Pc represents a member selected from the group consisting of copper phthalocyanine, cobalt phthalocyanine and nickel phthalocyanine radicals; $R^3$ is a member selected from the group consisting of hydrogen, lower alkyl, hydroxy lower alkyl and sulphato lower alkyl, and $R^4$ is a member selected from the group consisting of hydrogen, lower alkyl, hydroxy lower alkyl, sulphato lower alkyl, sulpho lower alkyl, cyclohexyl, benzyl, carboxyphenyl, disulphophenyl, and sulphophenyl, and $R^3$ and $R^4$ together form with the nitrogen atom N a heterocyclic ring selected from the group consisting of morpholine, piperidine and pyrrolidine; $a$ has a value of from 0 to 3, $b$ has a value of from 1 to 2 and $c$ has a value of from 0 to 2, provided that $a+b+c$ does not exceed 4 and provided that when $a$ is 0, at least one of $R^3$ and $R^4$ contains a member selected from the class consisting of a sulphonic acid and a —$OSO_3OH$ group; and L represents a group of the formula:

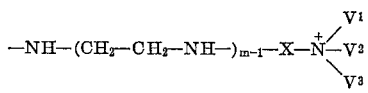

wherein $m$ is a positive integer not exceeding 2; X is a divalent radical selected from the class consisting of ethylene, β-hydroxytrimethylene and β-chlorotrimethylene radicals; $V^1$ is a lower alkyl radical, $V^2$ and $V^3$ are independently selected from the class consisting of lower alkyl and hydroxy lower alkyl radicals, and $V^1$, $V^2$ and $V^3$ together form with the nitrogen atom $N^+$ a heterocyclic ring system selected from the class consisting of heterocyclic ring systems of the formulae:

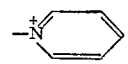

and

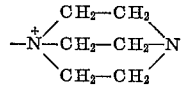

References Cited by the Examiner

UNITED STATES PATENTS

| | | | |
|---|---|---|---|
| 2,342,191 | 2/44 | Grossman | 8—25 |
| 2,506,020 | 5/50 | Grossman | 8—25 |
| 2,863,875 | 12/58 | Bienert | 260—314.5 |
| 3,053,849 | 9/62 | Clark | 260—314.5 |
| 3,053,850 | 9/62 | Clark | 260—314.5 |

FOREIGN PATENTS

| | | |
|---|---|---|
| 600,353 | 6/60 | Canada. |

NICHOLAS S. RIZZO, *Primary Examiner.*

MORRIS O. WOLK, *Examiner.*